(12) United States Patent
Huang

(10) Patent No.: US 10,976,003 B2
(45) Date of Patent: Apr. 13, 2021

(54) SUPPORT DEVICE

(71) Applicant: Ming-Hsien Huang, New Taipei (TW)

(72) Inventor: Ming-Hsien Huang, New Taipei (TW)

( * ) Notice: Subject to any disclaimer, the term of this patent is extended or adjusted under 35 U.S.C. 154(b) by 2 days.

(21) Appl. No.: 16/596,745

(22) Filed: Oct. 8, 2019

(65) Prior Publication Data

US 2020/0355315 A1 Nov. 12, 2020

(30) Foreign Application Priority Data

May 9, 2019 (TW) ................................. 108205770

(51) Int. Cl.
| *F16M 11/16* | (2006.01) |
| *F16M 11/04* | (2006.01) |
| *F16M 11/20* | (2006.01) |
| *F16M 11/12* | (2006.01) |

(52) U.S. Cl.
CPC ........... *F16M 11/16* (2013.01); *F16M 11/045* (2013.01); *F16M 11/046* (2013.01); *F16M 11/126* (2013.01); *F16M 11/2064* (2013.01); *F16M 2200/021* (2013.01); *F16M 2200/063* (2013.01); *F16M 2200/065* (2013.01)

(58) Field of Classification Search
CPC .... F16M 11/16; F16M 11/045; F16M 11/046; F16M 11/126; F16M 11/2064; F16M 2200/021; F16M 2200/063; F16M 2200/065; F16M 2200/06; F16M 2200/02; F16M 2200/022; F16M 2200/024; F16M 13/02; F16M 13/00; F16C 7/06; G06F 1/1601
See application file for complete search history.

(56) References Cited

U.S. PATENT DOCUMENTS

| 3,436,046 | A | * | 4/1969 | Valeska | ............. | F16M 11/2092 |
| | | | | | | 248/284.1 |
| 5,340,072 | A | * | 8/1994 | Halbirt | ................... | A61G 15/16 |
| | | | | | | 248/279.1 |
| 6,021,985 | A | * | 2/2000 | Hahn | ................. | A47B 21/0314 |
| | | | | | | 248/279.1 |
| 9,752,723 | B2 | * | 9/2017 | Hung | ..................... | F16M 13/02 |
| 2004/0188578 | A1 | * | 9/2004 | Turner | .................. | F16M 11/24 |
| | | | | | | 248/281.11 |
| 2017/0152987 | A1 | * | 6/2017 | Hung | ................. | F16M 11/2014 |
| 2017/0314731 | A1 | * | 11/2017 | Glaser | ............... | F16M 11/2064 |

* cited by examiner

*Primary Examiner* — Christopher Garft
(74) *Attorney, Agent, or Firm* — JCIPRNET

(57) ABSTRACT

A support device includes a base, a support arm, an air spring unit, and a hinge. The base is mounted on a reference surface; a first end of the support arm is pivotally connected to the base; the air spring unit is disposed in the support arm, and includes a switch assembly having a rotatable cam and an air spring, the cam has a first and a second lock points; the air spring provides a supporting force to the support arm, a tube thereof is disposed in the support arm, a piston rod thereof is telescopically disposed at a first end of the tube, and a release pin thereof is disposed at a second end of the tube. By adjusting the release pin abuts against the first lock point, a position of the hinge can be adjusted and then stopped at any position between the highest and lowest positions.

14 Claims, 13 Drawing Sheets

SUPPORT DEVICE

CROSS-REFERENCE TO RELATED APPLICATION

This application claims the priority benefit of Taiwan application serial no. 108205770, filed on May 9, 2019. The entirety of the above-mentioned patent application is hereby incorporated by reference herein and made a part of this specification.

BACKGROUND

Technical Field

The disclosure relates to a support device, and more specifically relates to a support device capable of preventing undesired rotating or tilting due to an unexpected external force.

Description of Related Art

Support devices are used in a variety of fields, such as homes, garages, hospitals, etc., to support electronic devices such as televisions and display screens.

Generally, the support device can be rotated or tilted relative to the plane on which the support device is mounted, and the state of the support device is easily changed so as to be conveniently adjusted by the user to meet requirements.

However, in some circumstances, the state of the support device must be fixed for a long time, such as, in a surgical room in a hospital, where the user does not want to change the position or angle of the display screen. How to prevent the state of the support device from being changed due to the expected external force becomes an important issue.

SUMMARY

The disclosure provides a support device capable of preventing an angle change due to an unexpected external force.

A support device of the disclosure is adapted to support an electronic device on a reference surface. The support device includes a base, a support arm, an air spring unit, and a hinge. The base is mounted on a reference surface. The support arm has a first end and a second end. The first end is pivotally connected to the base. The air spring unit is disposed at the support arm and includes a switch assembly and an air spring, the switch assembly has a rotatable cam, and the cam has a first and a second lock points. The air spring constantly provides a supporting force to the support arm and has a tube, a piston rod, and a release pin. The tube is disposed in the support arm, the piston rod is telescopically disposed at a first end of the tube, and the release pin is disposed at a second end of the tube far away from the piston rod. The hinge is connected to the second end of the support arm to mount the electronic device. When the release pin abuts against the first lock point of the cam, the piston rod can be moved relative to the tube, and the hinge can be stopped at any position between the highest and lowest positions, and when the release pin abuts against the second lock point of the cam, the piston rod cannot be moved relative to the tube, the position of the hinge cannot be changed between the highest and lowest positions.

In one embodiment of the disclosure, the switch assembly further has a handle, the handle can drive the cam to rotate and switch between an open position and a closed position, the release pin abuts against the first lock point at the open position, and the release pin abuts against the second lock point at the closed position.

In one embodiment of the disclosure, the switch assembly further has a body, the cam is disposed in the body, the handle penetrates through the body and the cam, and the piston rod of the air spring abuts against the body.

In one embodiment of the disclosure, the body has an accommodating space and a connecting hole, the connecting hole communicates with the accommodating space, the cam is accommodated in the accommodating space, and the release pin of the air spring passes through the connecting hole to abut against the cam.

In one embodiment of the disclosure, the body further has a main hole communicated with the accommodating space, the handle has a first grip and a shaft, the first grip is exposed from the support arm, the shaft penetrates through the main hole and the cam.

In one embodiment of the disclosure, the first lock point is located at a position where the cam has a minimum cam radius, and the second lock point is located at a position where the cam has a maximum cam radius.

In one embodiment of the disclosure, the support arm includes an upper connecting rod, a base rod, a lower connecting rod, and an engaging rod pivotally connected to each other. The base rod is disposed on the base. The hinge is disposed on the engaging rod. The upper connecting rod and the base rod are pivotally connected to a first axis, the base rod and the lower connecting rod are pivotally connected to a second axis, the lower connecting rod and the engaging rod are pivotally connected to a third axis, the engaging rod and the upper connecting rod are pivotally connected to a fourth axis, so as to constitute a structure of parallel four-bar linkage.

In one embodiment of the disclosure, the air spring further has a pivot unit connected to a tube and pivotally connected to the base rod.

In one embodiment of the disclosure, the pivot unit has a screw head and a pushing rod pivotally connected to each other, the screw head is screwed to the tube on a side far away from the piston rod, the pushing rod is pivotally connected to the base rod at a position between the first axis and the second axis, and the body of the switch assembly is disposed on the fourth axis.

In one embodiment of the disclosure, the second axis and the fourth axis have a distance therebetween, the air spring has a total length, when the support arm is pivoted relative to the base to the highest position, the distance and the total length are maximum.

In one embodiment of the disclosure, the hinge includes a VESA board, a first gear, an adapter, a second gear, an operating rod, and a spring. The VESA board has a plate body and a pair of assembly portions. The pair of assembly portions are bent from two opposite sides of the plate body towards the same direction. The first gear has a first gear portion and a recess. The first gear portion and the recess are adjacent to each other. The adapter is pivotally connected to the support arm and has two position limiting walls, a pair of wing plates, and a position limiting groove. The position limiting walls and the wing plates together define the position limiting groove. The second gear has a second gear portion and a protrusion. The second gear portion and the protrusion are adjacent to each other, and the second gear portion is adapted to engage with the first gear portion. The operating rod has a second grip and a rod body. The rod body is extended in an axial direction, the VESA board and the adapter are pivotally connected to the rod body, and the first gear and the second gear are sleeved on the rod body. The spring is disposed between the second gear and the first gear and constantly applies a force to separate the second gear and the first gear from each other. The operating rod can be rotated to switch between a locked state and an unlocked state, in the locked state, the second gear portion and the first gear portion are engaged and the VESA board is unable to rotate relative to the adapter, and the VESA board can be rotated relative to the adapter in the unlocked state.

In one embodiment of the disclosure, the rod body has a column part and a threaded part, the column part is located between the threaded part and the second grip.

In one embodiment of the disclosure, the first gear further includes a central through-hole, the second gear further includes a first central hole, the hinge further includes a stop plate disposed at the second gear on a side far away from the first gear and having a second central hole. The rod body of the operating rod penetrates through the central through-hole, the first central hole, and the second central hole. The second central hole and the threaded part are screwed with each other.

In one embodiment of the disclosure, the hinge further includes a locking member fastened to the threaded part of the rod body of the operating rod, so the rod body of the operating rod rotatably fastens the wing plates with the assembly portions.

In one embodiment of the disclosure, the hinge further includes a plurality of gaskets sleeved on the operating rod, and the gaskets are located between the locking member and the wing plates or located between the second grip and the wing plates.

In one embodiment of the disclosure, the protrusion is correspondingly accommodated in the recess.

In one embodiment of the disclosure, the protrusion has a first maximum arc length and a first central angle correspondingly in the axial direction, the recess has a second maximum arc length and a second central angle correspondingly in the axial direction, the second central angle is greater than the first central angle, and an angle that the VESA board can rotate relative to the adapter is a difference between the second central angle and the first central angle.

Based on the above, in the support arm of the disclosure, the user first greatly adjusts the rotating angle of the support arm relative to the base, and then slightly adjust the electronic device to the predetermined angle by using the hinge, so the electronic device is not easily moved by an unexpected external force.

In order to make the aforementioned and other features and advantages of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
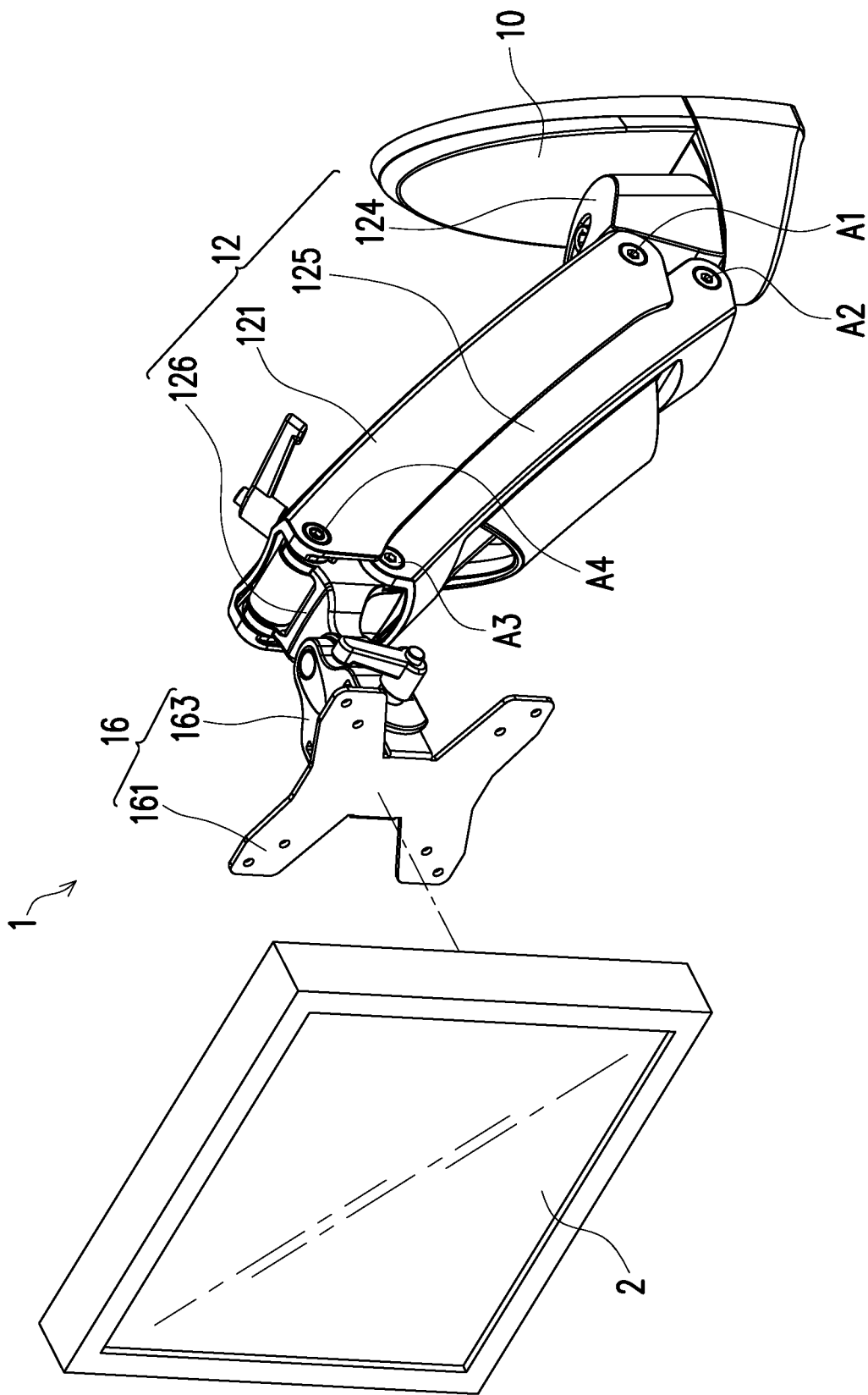
FIG. 1 is a three-dimensional schematic view of a support device of the disclosure.

Reference will now be made in detail to the present preferred embodiments of the disclosure, examples of which are illustrated in the accompanying drawings. Wherever possible, the same reference numbers are used in the drawings and the description to refer to the same or like parts.

Figure 2:
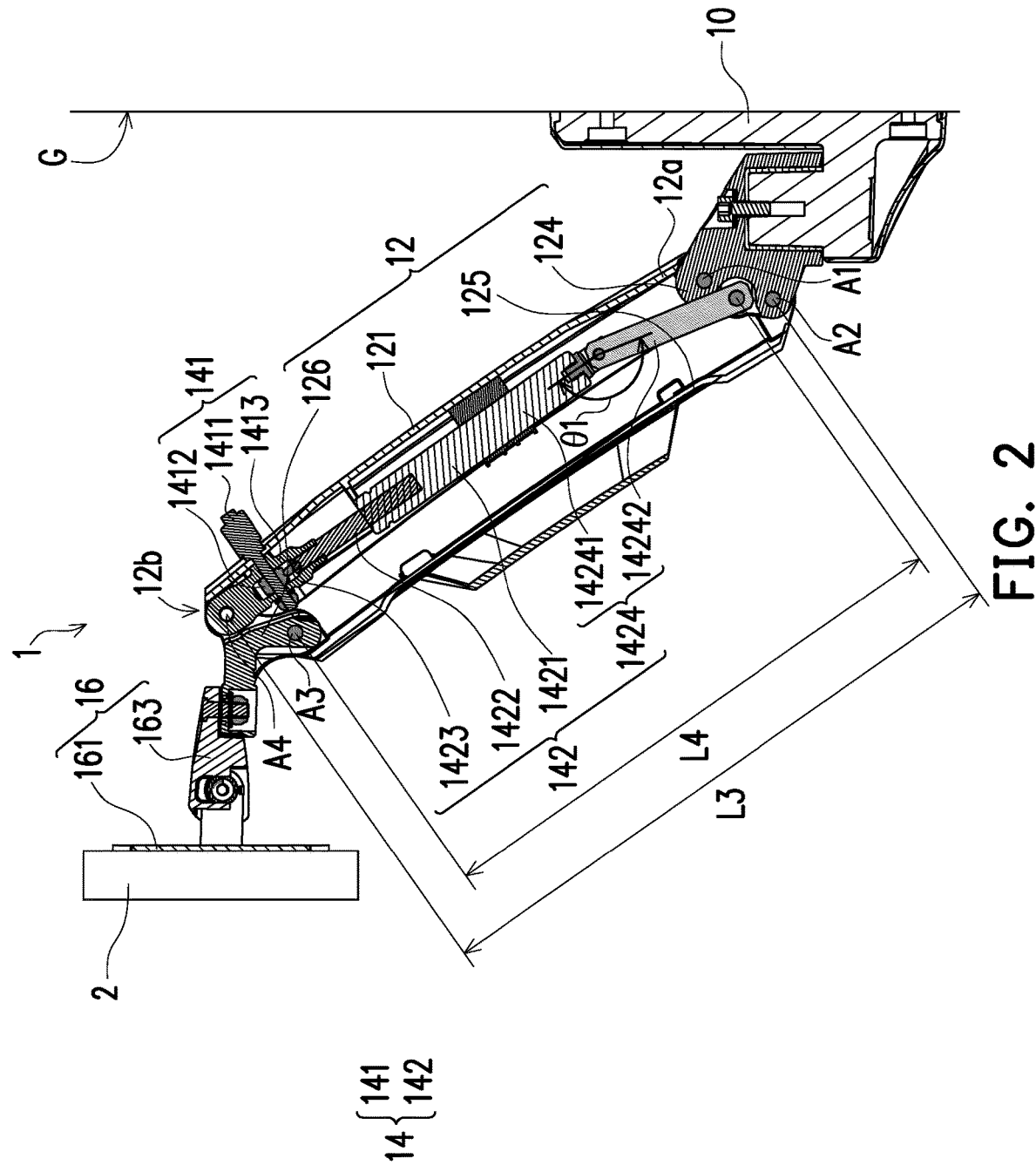
FIG. 2 is a cross-sectional schematic view of the support device in FIG. 1.

FIG. 1 is a three-dimensional schematic view of a support device of the disclosure, and FIG. 2 is a cross-sectional schematic view of the support device in FIG. 1. Referring to FIG. 1 and FIG. 2 simultaneously, a support device 1 of the present embodiment is used to support an electronic device 2, such as a display. The support device 1 includes a base 10, a support arm 12, an air spring unit 14, and a hinge 16. The base 10 is fixed to a reference surface G. In the present embodiment, the reference surface G is a wall surface but is not limited thereto. The reference surface G may be a desktop, and the disposing location and disposing way of the base 10 may be determined according to actual requirements. The support arm 12 has the first end 12a and the second end 12b. The first end 12a is connected to the base 10, the air spring unit 14 is disposed in the support arm 12, the hinge 16 is disposed at the second end 12b of the support arm 12, and the electronic device 2 is disposed on the hinge 16. The support arm 12 may be connected to the base 10, with the first end 12a serving as a rotating shaft, so as to rotate relative to the base 10, thereby adjusting the electronic device 2 to move far away or close to the reference surface G. When the support arm 12 rotates relative to the base 10, the angle between the support arm 12 and the base 10 (or the reference surface G) changes. When the support arm 12 is fixed, the user can further fix the electronic device 2 at a height required by the user through adjusting the hinge 16.

Figure 3:
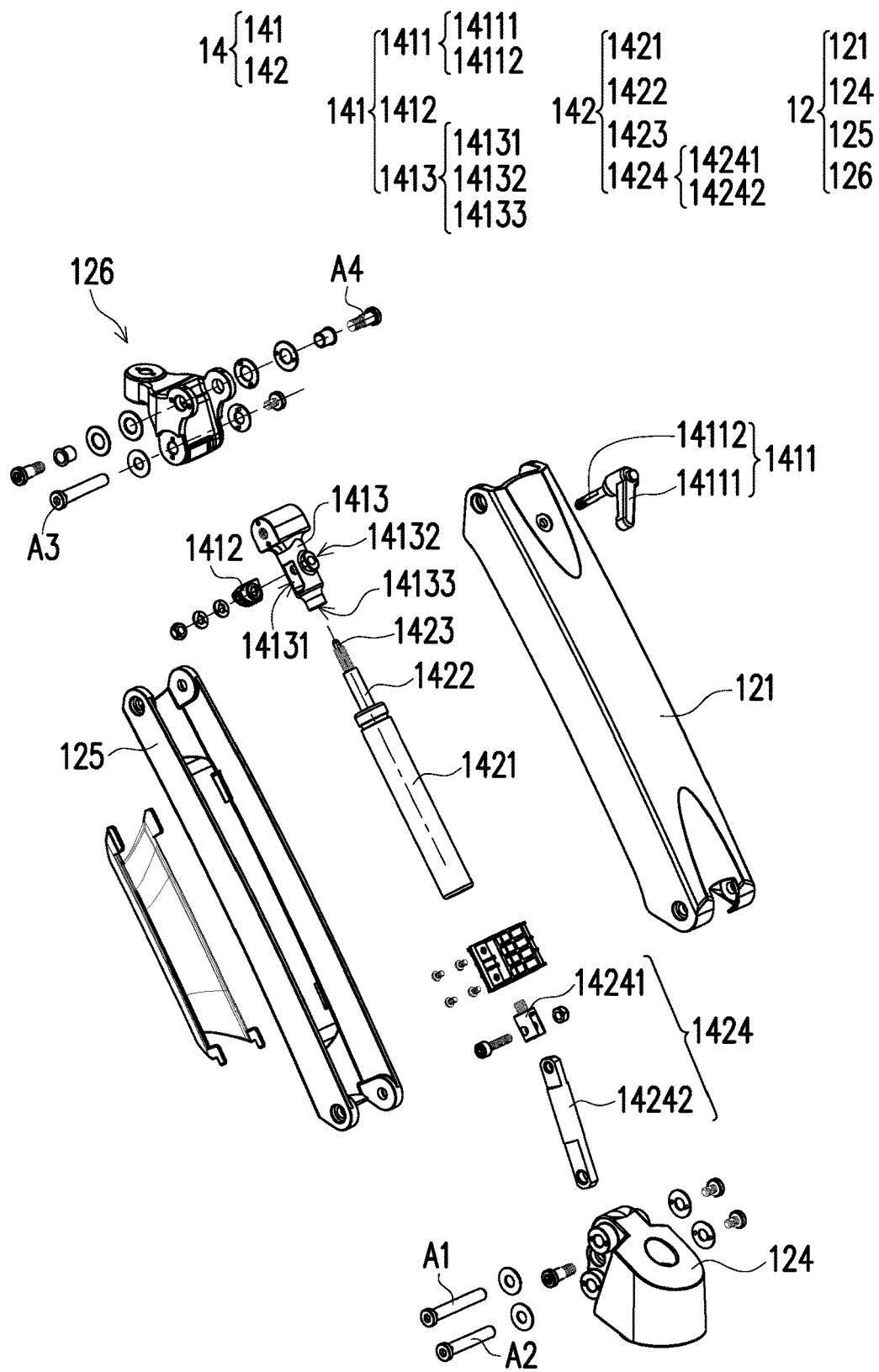
FIG. 3 is exploded schematic view of a support arm, an air spring unit, a hinge, and a base of the support device in FIG. 2.
Figure 3A:
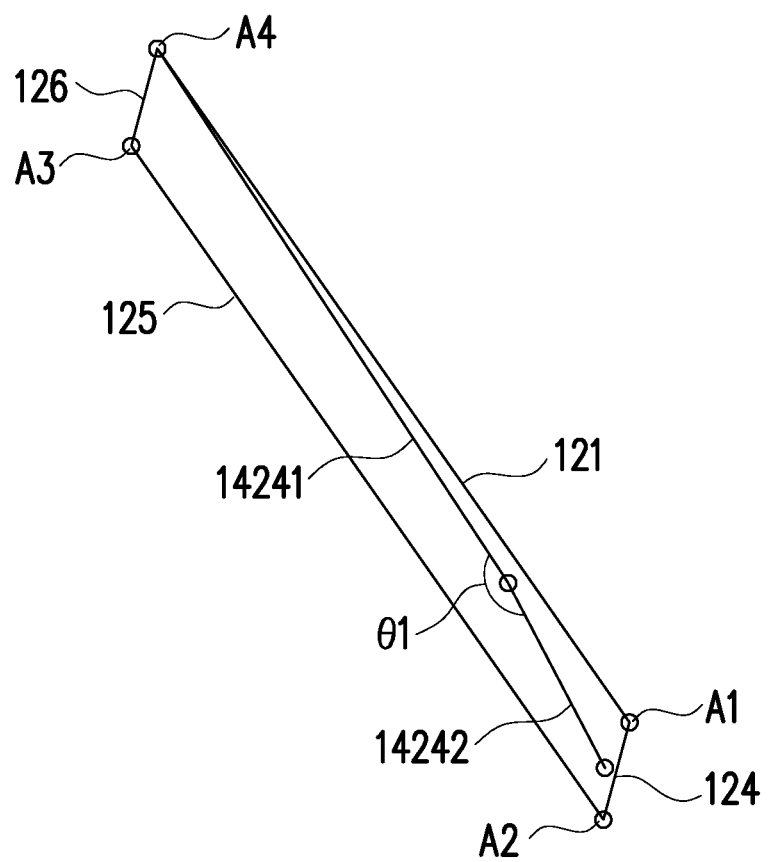
FIG. 3A is a schematic view of a structure of parallel four-bar linkage constituted by an upper connecting rod, a base rod, a lower connecting rod, and an engaging rod.

FIG. 3 is exploded schematic view of the support arm, the air spring unit, the hinge, and the base of the support device in FIG. 2. Referring to FIG. 1, FIG. 2, and FIG. 3 simultaneously, the support arm 12 includes an upper connecting rod 121, a base rod 124, a lower connecting rod 125, and an engaging rod 126. The upper connecting rod 121 and the base rod 124 are pivotally connected to the first axis A1, the base rod 124 and the lower connecting rod 125 are pivotally connected to the second axis A2, the lower connecting rod 125 and the engaging rod 126 are pivotally connected to the third axis A3, the engaging rod 126 and the upper connecting rod 121 are pivotally connected to the fourth axis A4. In other words, the upper connecting rod 121, the base rod 124, the lower connecting rod 125, and the engaging rod 126 constitute a structure of parallel four-bar linkage (as shown in FIG. 3A). Otherwise, the base rod 124 is rotatably disposed at the base 10, the hinge 16 is disposed at the engaging rod 126, two ends of the air spring unit 14 are respectively disposed at the base rod 124 and the engaging rod 126 so as to constantly provide a supporting force to the support arm 12.

Figure 4:
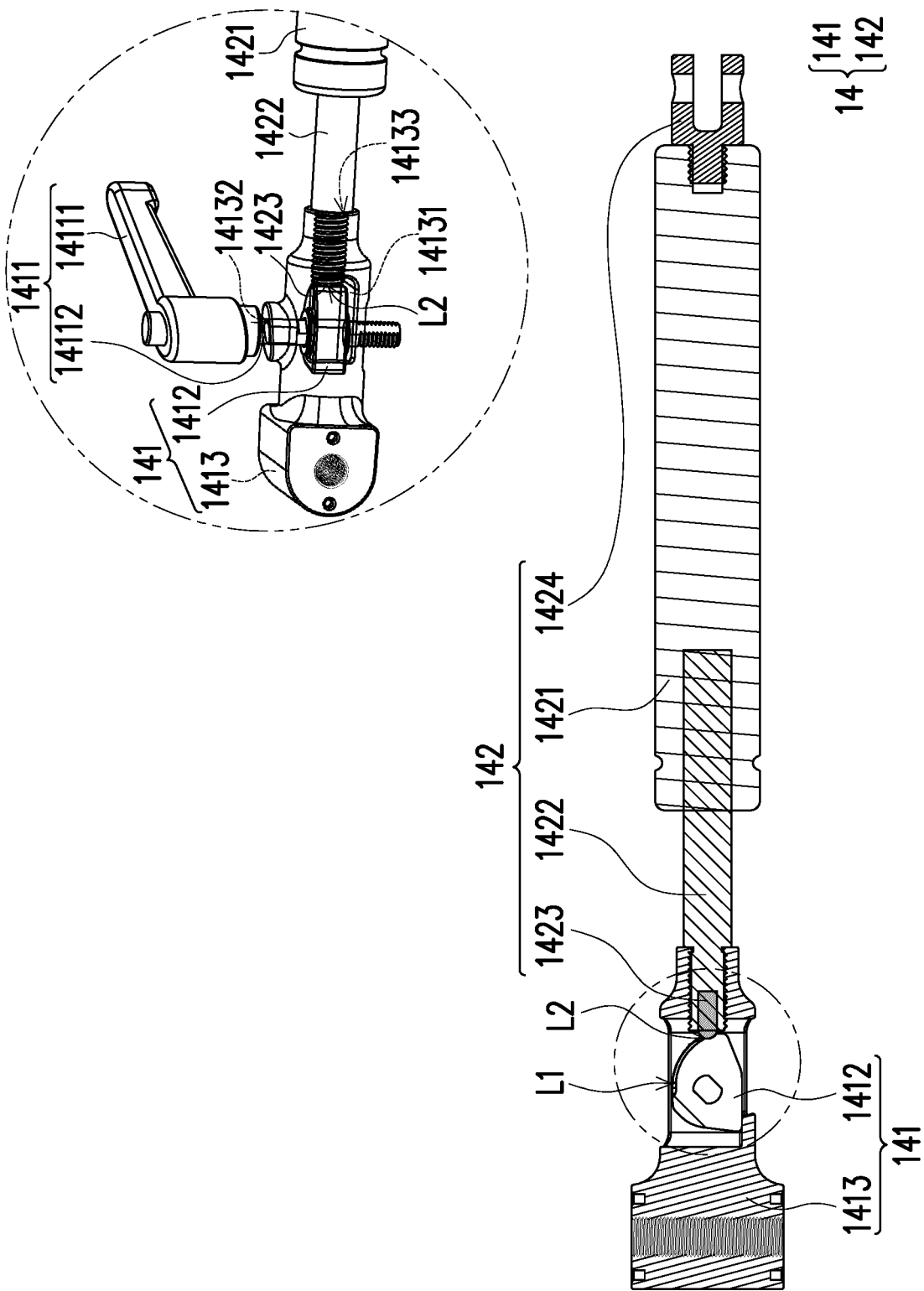
FIG. 4 is a schematic assembly view of the air spring unit in FIG. 3 when being locked.
Figure 5:
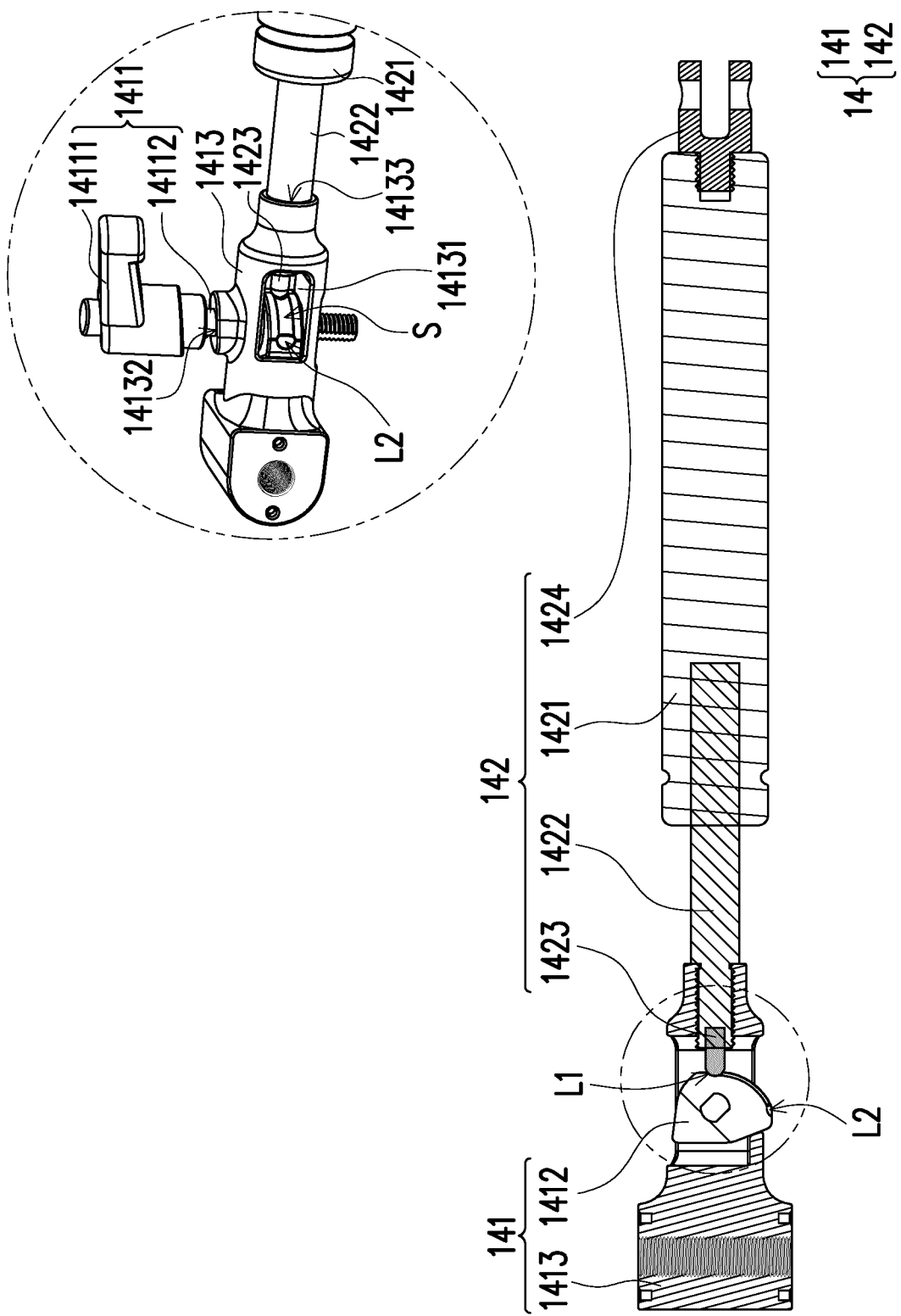
FIG. 5 is a schematic assembly view of the air spring unit in FIG. 4 when being unlocked.

FIG. 4 is a schematic assembly view of the air spring unit in FIG. 3 when being locked, and FIG. 5 is a schematic assembly view of the air spring unit in FIG. 4 when being unlocked. Referring to FIG. 3, FIG. 4, and FIG. 5 simultaneously, the air spring unit 14 includes a switch assembly 141 and an air spring 142. The switch assembly 141 includes a handle 1411, a cam 1412, and a body 1413. The body 1413 is disposed on the fourth axis A4 so that the air spring 142 can leans/abuts against. The handle 1411 has the first grip 14111 and a shaft 14112, the first grip 14111 is exposed from the upper connecting rod 121, and the shaft 14112 penetrates through the upper connecting rod 121 and is rotatably disposed in the body 1413. The cam 1412 is disposed in the body 1413, and the shaft 14112 penetrates through the cam 1412 and drives the cam 1412 to rotate.

Take a step further, the body 1413 has an accommodating space 14131, a main hole 14132, and a connecting hole 14133. Each of the main hole 14132 and the connecting hole 14133 is communicated with the accommodating space 14131. The cam 1412 is accommodated in the accommodating space 14131. The shaft 14112 penetrates through the main hole 14132 and the cam 1412. The air spring 142 passes through the connecting hole 14133 to abut against the cam 1412.

The air spring 142 of the present embodiment is a lockable air spring which constantly provides the supporting force to the support arm 12. The air spring 142 has a tube 1421, a piston rod 1422, a release pin 1423, and a pivot unit 1424. The piston rod 1422 is movably disposed in the tube 1421 and abuts/presses against the body 1413 of the switch assembly 141, and the release pin 1423 is formed at one end, which is far away from the tube 1421, of the piston rod 1422 and passes through the connecting hole 14133 to abut/press against the cam 1412 of the switch assembly 141. Meanwhile, the pivot unit 1424 is disposed at one end, which is far away from the switch assembly 141, of the tube 1421. When the release pin 1423 protrudes (as shown in FIG. 5) to keep an air valve (not shown) open, the piston rod 1422 can be moved relative to the tube 1421. By contrast, when the release pin 1423 is pressed to be retracted (as shown in FIG. 4), the air vale is closed so the piston rod 1422 cannot be moved relative to the tube 1421. The pivot unit 1424 has a screw head 14241 and the aforementioned pushing rod 14242 pivotally connected to each other, the screw head 14241 is screwed to the tube 1421, the pushing rod 14242 is pivotally connected to the base rod 124 at a position between the first axis A1 and the second axis A2, and the screw head 14241 and the pushing rod 14242 forms the first included angle θ1 (as shown in FIG. 3A).

Based on above description, the side of the cam 1412 has a sliding slot S and the first lock point L1 and the second lock point L2 located at two ends of the sliding slot S. The first lock point L1 is located at a position where the cam has a minimum cam radius, and the second lock point L2 is located at a position where the cam has a maximum cam radius. Additionally, the position that the release pin 1423 abuts/presses against of the cam 1412 can determine whether the support arm 12 can be operated. In other words, the handle 1411 of the switch assembly 141 can be rotated and changed between the closed position (as shown in FIG. 4) and the open position (as shown in FIG. 5). As shown in FIG. 4, in the closed position, the release pin 1423 abuts against the second lock point L2. Since the second lock point L2 is located at the position that corresponding to the maximum cam radius, the release pin 1423 is relatively pressed and retracted to keep the air valve (not shown) closed, so the piston rod 1422 cannot be moved relative to the tube 1421 and thus the support arm 12 cannot be operated. As shown in FIG. 5, at the open position, the release pin 1423 abuts against the first lock point L1. Since the first lock point L1 is located at the position that corresponding to the minimum cam radius, the air valve (not shown) is opened, the piston rod 1422 can be operated relative to the tube 1421, so the angle between the support arm 12 and the base 10 can be adjusted according to requirements. Accordingly, the position of the electronic device 2 can be adjusted and the electronic device 2 can be stopped at any position. Incidentally, in response to the movement of the release pin 1423 along the sliding slot S from the second lock point L2 to the first lock point L1, the air vale is switched from the closed state to open state (due to the change in radius of the cam) according to the position of the release pin 1423 in the sliding slot S, so it is not necessary to wait until the release pin 1423 is moved to the first lock point L1 to open the air valve.

The first grip 14111 of the switch assembly 141 in FIG. 4 and FIG. 5 may also be disposed upside down, the first grip 14111 is exposed from the lower connecting rod 125, the body 1413 of the switch assembly 141 is located at the position between the third axis A3 and the fourth axis A4, the pushing rod 14242 is accordingly disposed on the second axis A2. On the other hand, the pushing rod 14242 may also be omitted, and the screw head 14241 is pivoted to the base rod 124 directly.

Figure 6:
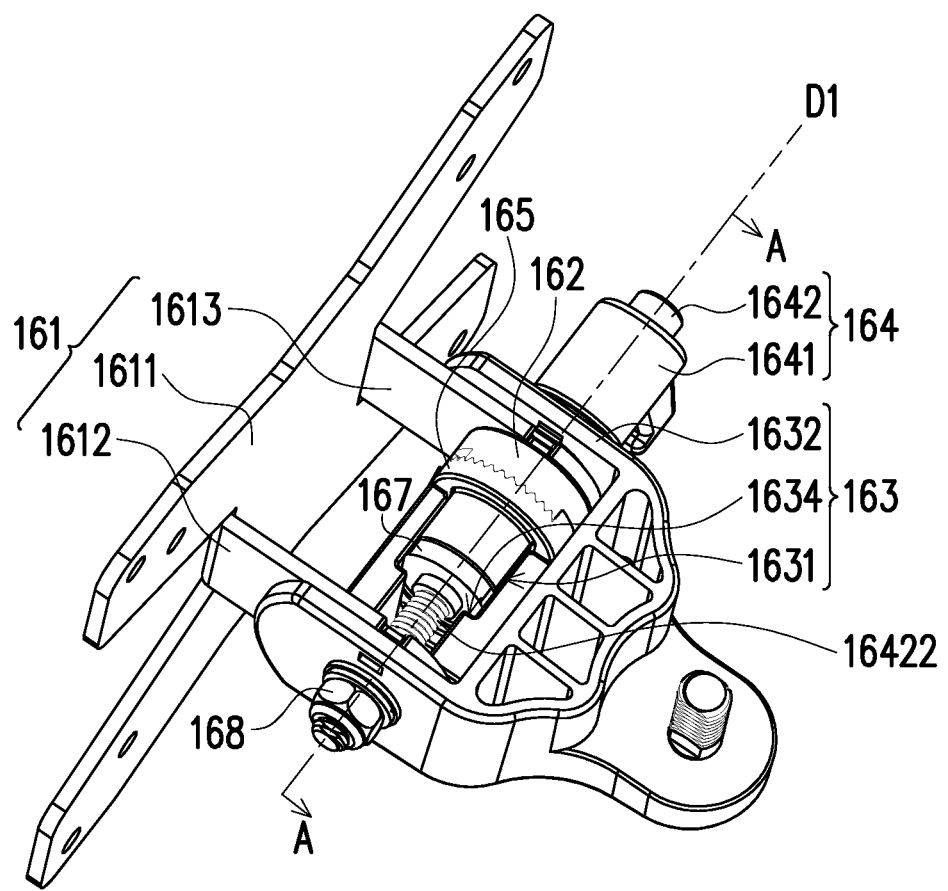
FIG. 6 is a schematic assembly view of the hinge in FIG. 2.
Figure 7:
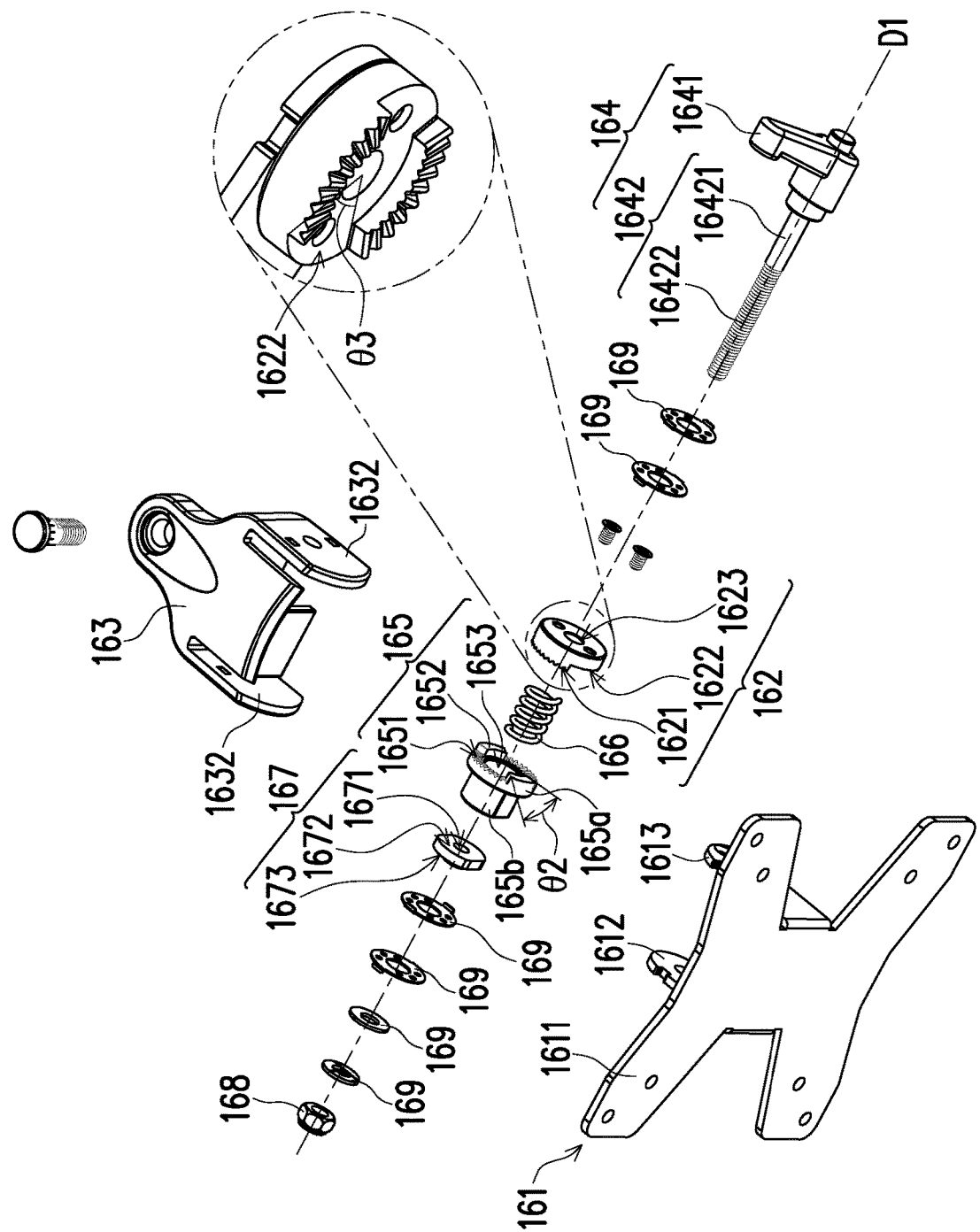
FIG. 7 is an exploded schematic view of the hinge in FIG. 6, wherein the viewing angle in FIG. 7 is opposite the viewing angle in FIG. 6.
Figure 8:
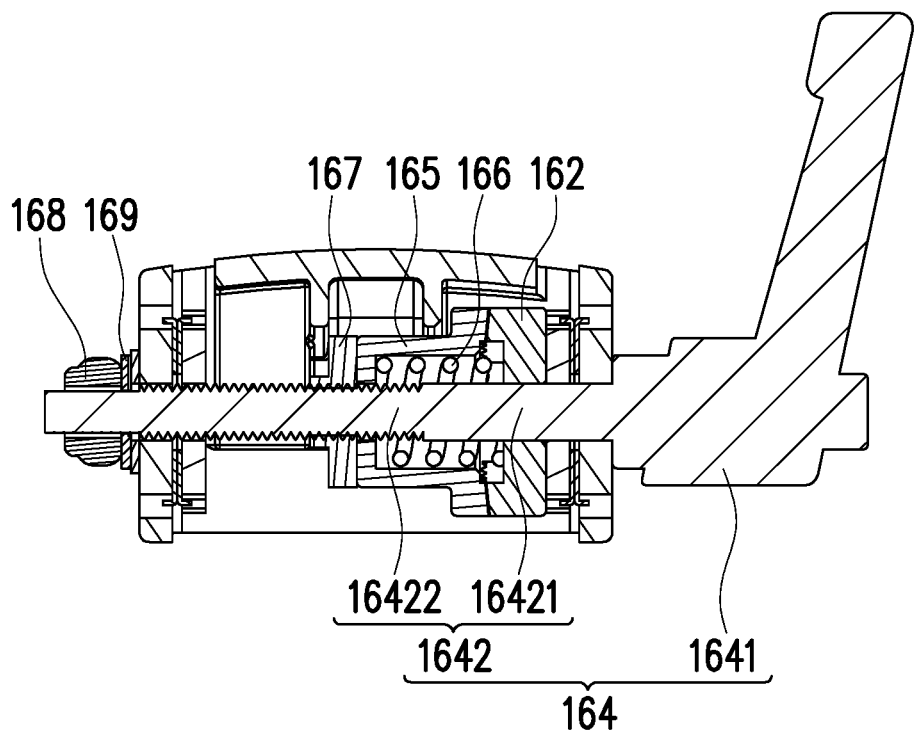
FIG. 8 is a schematic cross-sectional view along line A-A in FIG. 6.

FIG. 6 is a schematic assembly view of the hinge in FIG. 2, and FIG. 7 is an exploded schematic view of the hinge in FIG. 6, wherein the viewing angles in FIG. 6 and FIG. 7 are different. FIG. 8 is a schematic cross-sectional view along line A-A in FIG. 6.

Referring to FIG. 6, FIG. 7, and FIG. 8 simultaneously, the hinge 16 includes a VESA (Video Electronics Standards Association) board 161, the first gear 162, an adapter 163, an operating rod 164, the second gear 165, a spring 166, and a stop plate 167. The operating rod 164 has the second grip 1641 and a rod body 1642, the rod body 1642 is extended in an axial direction D1, the VESA 161 and the adapter 163 are pivotally connected to the rod body 1642, and the first gear 162, the second gear 165, the spring 166, and the stop plate 167 all are sleeved on the rod body 1642. Otherwise, the rod body 1642 further includes a column part 16421 adjacent to the second grip 1641 and a threaded part 16422 relatively far away from the second grip 1641. To be more specific, the VESA board 161 is a board with a hole pattern size for a display, defined by Video Electronics Standards Association, such as 35 mm×75 min or 50 mm×75 mm.

Furthermore, the VESA board 161 has a plate body 1611 used to dispose the electronic device 2 and a pair of assembly portions 1612 and 1613 which are bent from two opposite sides of the plate body 1611 towards the same direction. The adapter 163 is pivotally connected to the engaging rod 126 of the support arm 12 and has two position limiting walls 1631, two wing plates 1632, and a position limiting groove 1634 which is surrounded and formed by the position limiting walls 1631 and the wing plates 1632. The rod body 1642 penetrates through the wing plates 1632 and the assembly portions 1612 and 1613. To be more specific, the assembly portions 1612 and 1613 are located on the inner side of the wing plates 1632. In other words, the assembly portions 1612 and 1613 are both located in the position limiting groove 1634. However, the relative position between the assembly portions 1612 and 1613 and the wing plates 1632 is not limited to the present embodiment. In other embodiments, the assembly portions 1612 and 1613 may also be located on the outer side of the wing plates 1632.

The first gear 162 is fixed to the assembly portion 1613 and has the first gear portion 1621, a recess 1622, and a central through-hole 1623. The rod body 1642 penetrates through the central through-hole 1623. The first gear portion 1621 and the recess 1622 are formed on a side away from the wing plates 1632. The second gear 165 has a second gear portion 1651, a protrusion 1652, and the first central hole 1653. The rod body 1642 penetrates through the central through-hole 1623. The second gear portion 1651 and the protrusion 1652 are formed on a side close to the first gear 162. In addition, the second gear portion 1651 can be optionally engaged with the first gear portion 1621. The spring 166 is disposed between the second gear 165 and the first gear 162. In the present embodiment, the spring 166 is a compressed spring and constantly provides an elastic force to separate the second gear 165 and the first gear 162 from each other. The stop plate 167 abuts against the second gear 165 on a side away from the first gear 162 and has the second central hole 1671, the first position limiting wall 1672, and the second position limiting wall 1673. The second central hole 1671 is adapted to be screwed with the threaded part 16422 of the rod body 1642 of the operating rod 164. The first position limiting wall 1672 faces a surface which is away from the first gear 162, of the second gear 165, and the second position limiting wall 1673 faces towards the assembly portion 1612.

Figure 9:
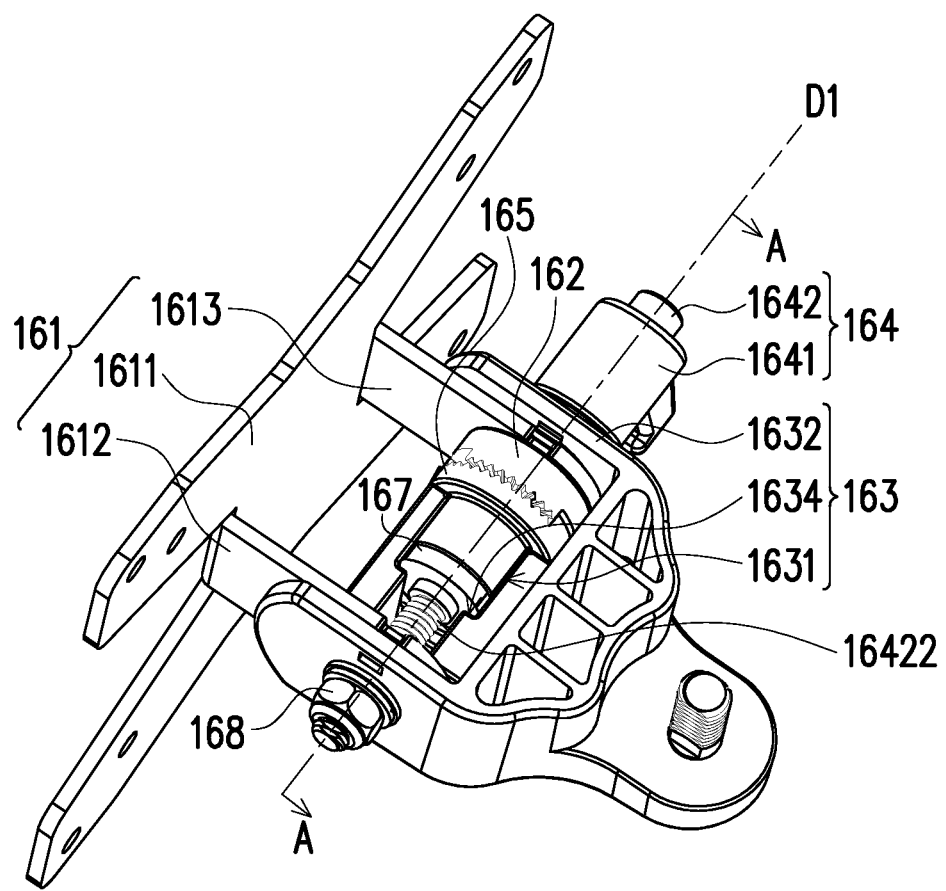
FIG. 9 is a schematic view of the teeth of the first gear and the second gear of the hinge in FIG. 6 being separated.

Based on the above configuration, the operating rod 164 can be rotated to switch between a locked state (as shown in FIG. 6) and an unlocked state (as shown in FIG. 9). In the locked state, the distance between the stop plate 167 and the first gear 162 is shortest, so the second gear portion 1651 and the first gear portion 1621 are engaged and fixed to each other. Therefore, neither the VESA board 161 nor the adapter 163 can rotate relative to the operating rod 164, so the position of the electronic device 2, which is mounted on the VESA board 161, cannot be adjusted. When the operating rod 164 is rotated from the locked state to the unlocked state, the first position limiting wall 1672 and the second position limiting wall 1673 of the stop plate 167 respectively interfere with the two position limiting walls 1631, so the stop plate 167 is not rotated together with the operating rod 164. However, the second central hole 1671 and the threaded part 16422 are rotated relative to each other. Therefore, the stop plate 167 is moved linearly along the axial direction D1 of the operating rod 164 and is also gradually moved further away from the first gear 162. Since the spring 166 pushes the first gear 162 and the second gear 165 towards opposite directions, the second gear portion 1651 and the first gear portion 1621 are no longer engaged and fixed to each other, and the position of the electronic device 2 mounted on the VESA board 161 can be adjusted.

It should be noted here, the cross-sections of the stop plate 167 and the position limiting groove 1634 are both non-circular, such as a shape like a circle being cut at both sides. The shapes of the stop plate 167 and the position limiting groove 1634 are conformed with each other in order to achieve that the stop plate 167 is moved linearly along the axial direction D1 of the operating rod 164 in the position limiting groove 1634, and the stop plate 167 does not rotate relative to the position limiting groove 1634 with the axial direction D1 of the operating rod 164 serving as the rotating axis. To be more specific, the two position limiting walls 1631 which form the position limiting groove 1634 are parallel to each other and connected to each other by the two curved portions. In other words, the shape of the cross-section of the position limiting groove 1634 along the axial direction D1 of the operating rod 164 is roughly similar to a shape of a racetrack in a stadium, and the shape of the stop plate 167 is the same as the shape of the position limiting groove 1634. Therefore, when the operating rod 164 is rotated, the parallel walls (not labeled) of the stop plate 167 are restricted by the two position limiting walls 1631 that are parallel to each other and form the position limiting groove 1634, so the stop plate 167 cannot be rotated in the position limiting groove 1634. However, the shapes of the stop plate 167 and the position limiting groove 1634 are not limited to the shapes in the present embodiment and may be adjusted by people of ordinary skill in the art according to actual demand without violating the design spirit of the stop plate 167 and the position limiting groove 1634. Otherwise, along the axial direction D1 of the operating rod 164, the portion, which is accommodated in the position limiting groove 1634, of the second gear 165 also has the same cross-section as the position limiting groove 1634, so as to prevent the second gear 165 from being unexpectedly and improperly rotated relative to the operating rod 164.

Figure 10:
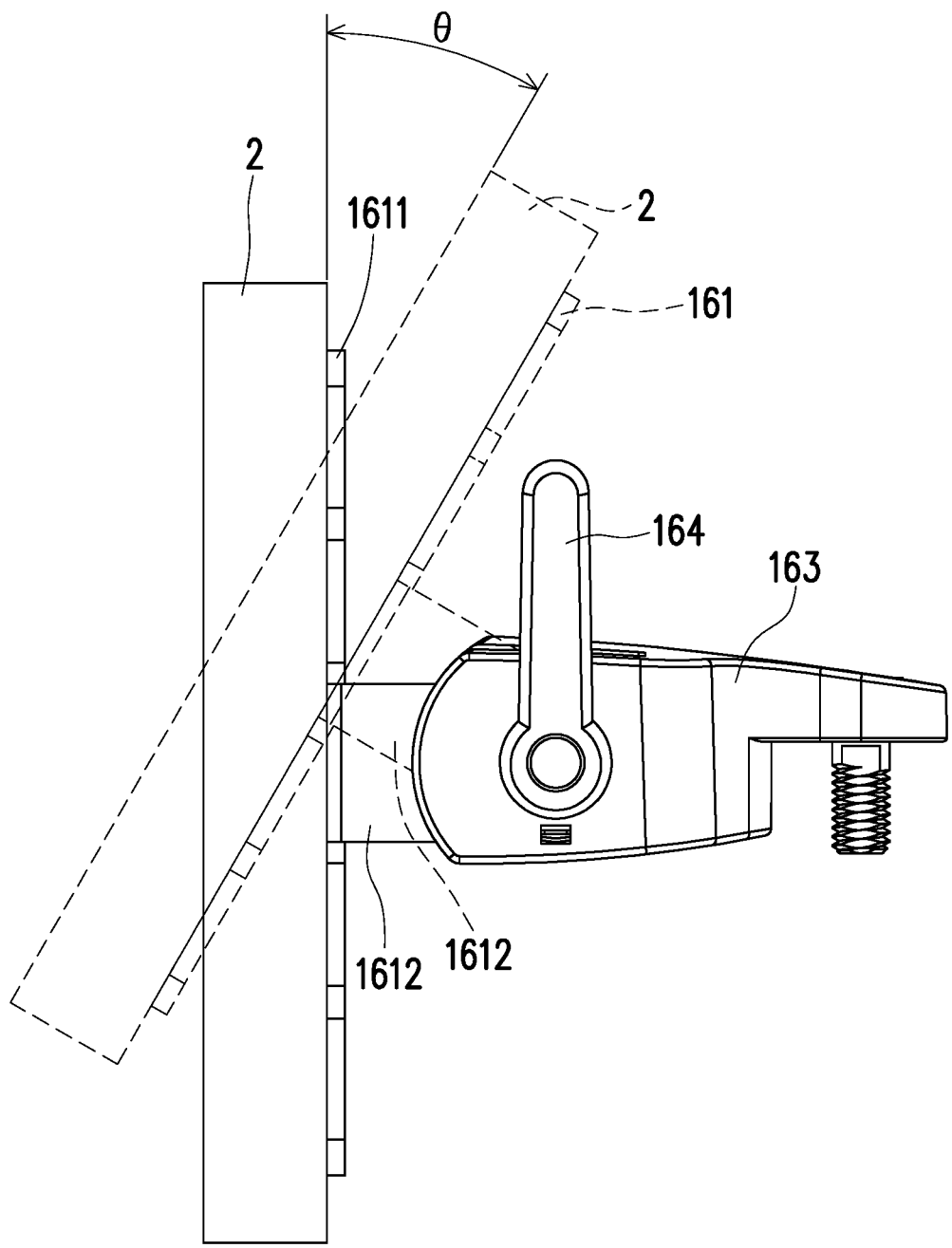
FIG. 10 is a schematic view showing that the VESA board is inclined with respect to the second gear.

Specifically, a distance that the stop plate 167 is moved linearly along the axial direction D1 of the operating rod 164 is not too large. Hence, in the unlocked state, the protrusion 1652 is still disposed in the recess 1622, thereby restricting the pivoting angle of the VESA board 161 (or the electronic device 2), so as to prevent the electronic device 2 from being unintentionally collided. In the present embodiment, the protrusion 1652 has a first maximum arc length and a first central angle θ2 correspondingly in the axial direction D1. The recess 1622 has a second maximum arc length and a second central angle θ3 correspondingly in the axial direction D1. The second central angle θ3 is about 45 degrees greater than the first central angle θ2. In other words, as shown in FIG. 10, the adjustable range of the inclined angle θ of the electronic device 2 is 45 degrees. Otherwise, the positions of the protrusion 1652 and the recess 1622 are interchangeable.

Incidentally, the numbers of teeth of one of the first gear portion 1621 and the second gear portion 1651 can be different. Otherwise, the hinge 16 of the present embodiment further includes a locking member 168 fastened to the threaded part 16422 of the operating rod 164 by the screw thread locking method. The locking member 168 may be a nut so the rod body 1642 of the operating rod 164 is rotatably fastened to the wing plates 1632 and the assembly portions 1612 and 1613, in order to avoid falling off. Furthermore, the hinge 16 further includes a plurality of gaskets 169 sleeved on the operating rod 164, and a part of the gaskets 169 are located between the locking member 168 and the wing plates 1632, or a part of the gaskets 169 are located between the assembly portion 1612 and the stop plate 167. If it is necessary, the gaskets 169 may also be disposed between the wing plates 1632 and the assembly portion 1612.

In contrast, the gaskets 169 may also be disposed between the second grip 1641 and the assembly portion 1613. Additionally, the gaskets 169 may be disposed between the wing plates 1632 and the assembly portion 1613.

Structurally, the second gear 165 and the stop plate 167 may be integrally formed according to design requirements. Under such condition, the spring 166 may be omitted.

The operation of the support device 1 is described as follows.

Figure 11:
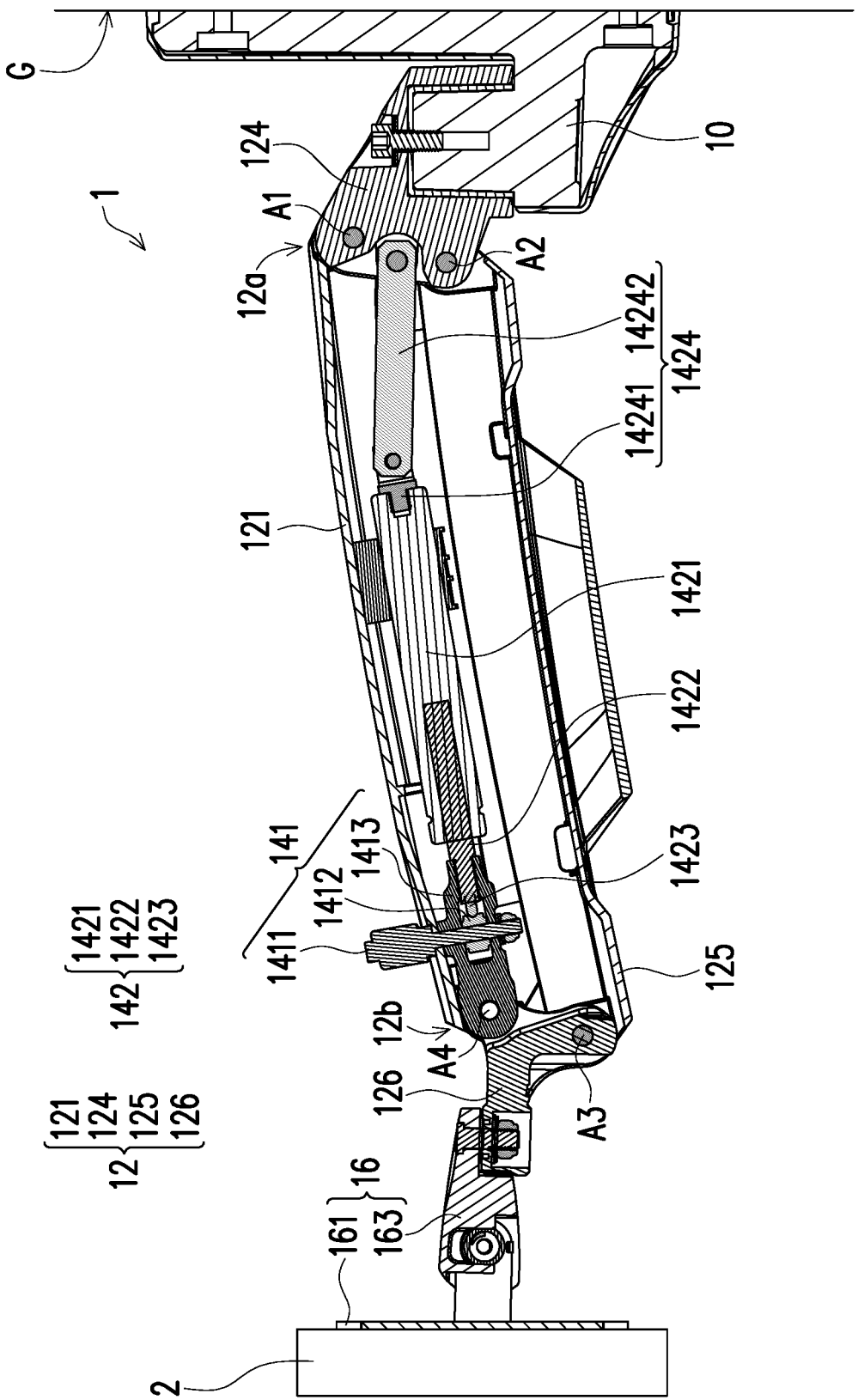
FIG. 11 and FIG. 12 are schematic views of the support arm at different angles relative to the base.
Figure 12:
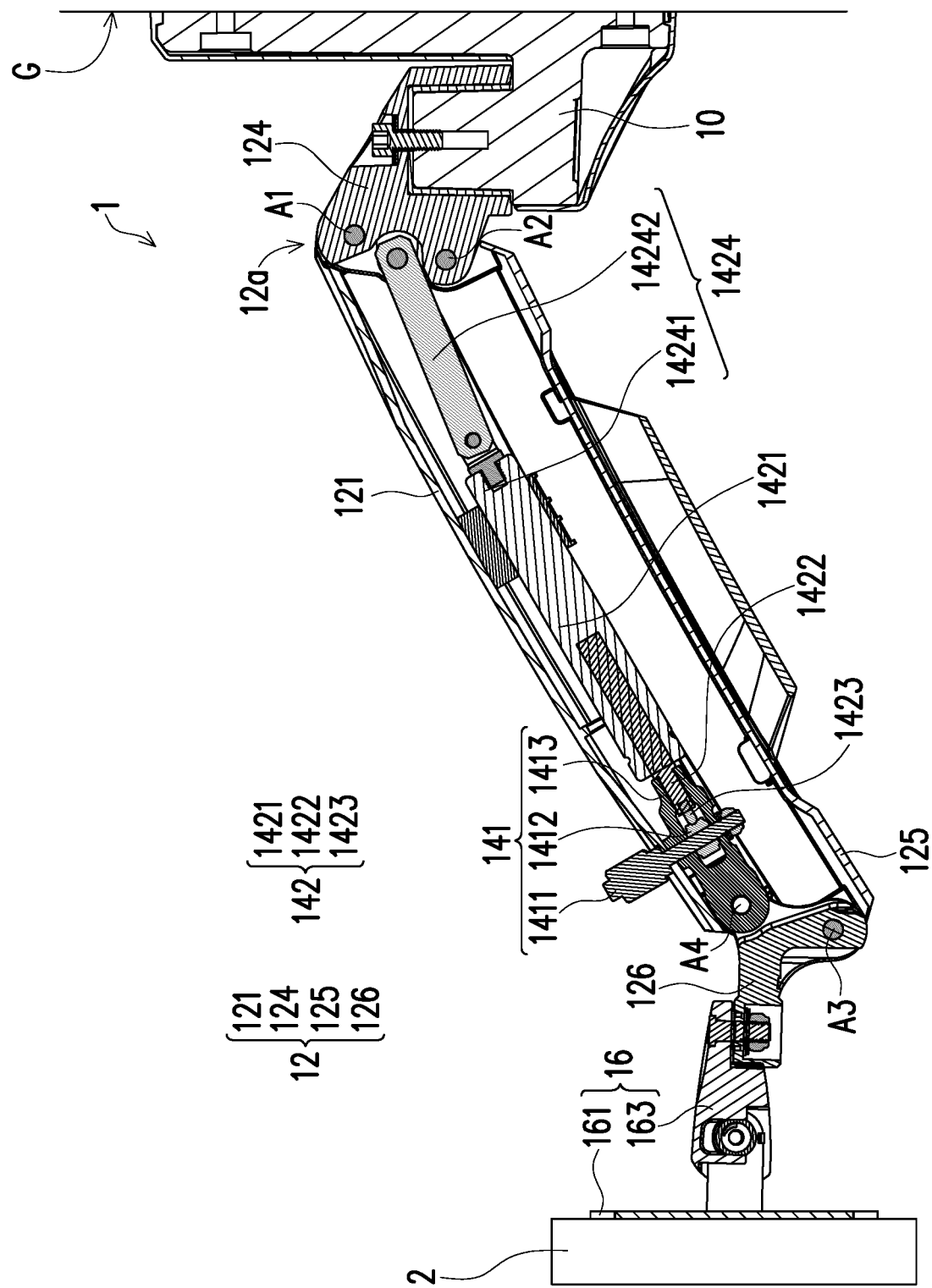

FIG. 11 and FIG. 12 are schematic views of the support arm at different angles relative to the base. Referring to FIG. 2, FIG. 11, and FIG. 12 simultaneously, when the support device 1 is in the state shown in FIG. 2, the support arm 12 is lifted relative to the base 10, and the electronic device 2 is located at a highest position. When the support device 1 is in the state shown in FIG. 11, the support arm 12 is raised lower than the position in FIG. 2, and the electronic device 2 is located at a middle position (which is substantially horizontal position). When the support device 1 is in the state shown in FIG. 12, the support arm 12 is raised lower than the position in FIG. 9, and the electronic device 2 is located at a lowest position. The height of the middle position is smaller than the height of the highest position and is larger than the height of the lowest position. It should be noted here, the highest position, the middle position, and the lowest position in this description are the relative positions of the electronic device 2 shown in FIG. 2, FIG. 11, and FIG. 12, but the angle that the support arm 12 is pivoted to the stand 10 is not limited.

To be more specific, the second axis A2 and the fourth axis A4 have a distance L3 therebetween, the air spring 142 has a total length L4. When the electronic device 2 is stopped at the highest position as shown in FIG. 2, the distance L3 between the second axis A2 and the fourth axis A4 is maximum, and the total length L4 of the air spring 142 is maximum.

Specifically, when the switch assembly 141 of the air spring unit 14 is at the closed position (where the release pin 1423 abuts against the second lock point L2), the user cannot freely change the position of the support arm 12. The handle 1411 of the switch assembly 141 must be rotated to switch the switch assembly 141 to the open position (where the release pin 1423 abuts against the first lock point L1), so the support arm 12 can be moved relative to the base 10.

Referring to FIG. 2 and FIG. 4, when the electronic device 2 is stopped at the highest position as shown in FIG. 2, the handle 1411 is at the closed position, the release pin 1423 abuts against the second lock point L2. Since the second lock point L2 is located at the position that has maximum cam radius, the release pin 1423 is relatively pressed and retracted to close the air valve, so the piston rod 1422 cannot be moved relative to the tube 1421, the air spring unit 14 is in the locked state, and the support arm 12 cannot be pivoted relative to the base 10.

When the user prepares to move the support arm 12, the user releases the air spring unit 14 from the locked state by rotating the handle 1411.

Referring to FIG. 5, FIG. 11, and FIG. 12 simultaneously, the user can rotate the handle 1411 in a rotating direction (e.g., clockwise direction), so the handle 1411 drives the cam 1412 to rotate. Along with rotation of the cam 1412, the release pin 1423 is moved from the second lock point L2 into the sliding slot S. Additionally, because of the radius change of the cam 1412, the release pin 1423 gradually protrudes from the piston rod 1422 and the air valve is opened. Therefore, the total length L4 of the air spring 142 may be changed. At this time, the user can rotate the support arm 12 relative to the base 10, as needed, to change the position of the electronic device 2 to the middle position shown in FIG. 11, to the lowest position shown in FIG. 12, or to any position between the highest position and the lowest position.

The release pin 1423 is moved along the sliding slot S to enter the first lock point L1. When the release pin 1423 enters the first lock point L1, since the first lock point L1 is a pit/hole, the user can feel when the release pin 1423 snaps into the first lock point L1, as a feedback, so that the user stops rotating the handle 1411.

After the user moves the support arm 12 to the middle position in FIG. 11 or the lowest position in FIG. 12, the user can hold the handle 1411 again to rotate the handle 1411 is a direction opposite to the rotating direction, for example, counterclockwise direction, so the release pin 1423 is returned from the first lock point L1 along the sliding slot S to the second lock point L2. In response to the movement of the release pin 1423 along the sliding slot S, the air valve is locked again, and the air spring unit 14 is in the locked state again, so the angle of the support arm 12 relative to the base 10 is fixed.

In the present embodiment, similarly, the second lock point L2 and the first lock point L1 are pits/holes. Therefore, the user can also feel by hand when the release pin 1423 snaps into the second lock point L2, as a feedback. Otherwise, although the handle 1411 is turned clockwise to be unlocked and is turned counterclockwise to be locked, in other embodiments, it is also possible that the handle 1411 in rotated in one direction to be unlocked and locked.

Next, the user can adjust the angle (for example, the inclined angle) of the electronic device 2 relative to the support arm 12 through the hinge 16, as shown in FIG. 10.

Referring to FIG. 6, FIG. 7, and FIG. 10 simultaneously, at the locked state, the second gear portion 1651 of the second gear 165 is engaged with the first gear portion 1621 of the first gear 162, and the protrusion 1652 of the second gear 165 is located in the recess 1622 of the first gear 162. At this time, the plate body 1611 of the VESA board 161 is fixed at the first position with respect to the adapter 163.

Next, referring to FIG. 7, FIG. 9, and FIG. 10 simultaneously, when the angle of the electronic device 2 with respect to the adapter 163 needs being changed, the user holds the second grip 1641 of the operating rod 164 and rotates the second grip 1641 in counterclockwise direction in order to rotate the operating rod 164. Because of the cooperation of the threaded part 16422 of the rod body 1642 of the operating rod 164 and the second central hole 1671 of the stop plate 167, in addition of the effect of the spring 166, the second gear 165 and the stop plate 167 is moved in the position limiting groove 1634 of the adapter 163 toward the assembly portion 1612.

Specifically, the shape of the cross section of the stop plate 167 and the shape of the cross section of the position limiting groove 1634 are not circular shape and are conformed with each other, so that the second gear 165 is linearly moved in the position limiting groove 1634 along the axial direction D1, and the stop plate 167 cannot be rotated relative to the position limiting groove 1634. Otherwise, the second gear 165 of the present embodiment may have a head portion 165*a* and a neck portion 165*b*. The second gear portion 1651 and the protrusion 1652 are disposed at the head portion 165*a*, and the neck portion 165*b* connected to the head portion 165*a* is close to the stop plate 167 disposed in the position limiting groove 1634. The neck portion 165*b* has two parallel side walls (not shown). That is, the neck portion 165*b* has a cross sectional shape like a circle being cut at both sides (similar to the shape of the racetrack in the stadium).

Moreover, since the spring 166 constantly applies the elastic force to the first gear 162 and the second gear 165, it is ensured that the second gear 165 is smoothly separated from the first gear 162.

After the second gear portion 1651 of the second gear 165 and the first gear portion 1621 of the first gear 162 are separated and not engaged with each other, the user can easily change the angle of the plate body 1611 of the VESA board 161 with respect to the adapter 163, so that the electronic device 2 is presented at a desired angle of the user, as shown in FIG. 10.

After confirming that the electronic device 2 is at the desired angle of the user, the user can reversely rotate the second grip 1641 of the operating rod 164, the second gear 165 is moved towards the first gear 162 through the cooperation of the threaded part 16422 of the rod body 1642 of the operating rod 164 and the internal thread of the second gear 165, so the second gear portion 1651 and the first gear portion 1621 are tightly engaged again, so as to fix the inclined angle θ of the electronic device 2 with respect to the adapter 163.

Incidentally, the first gear portion 1621 and the second gear portion 1651 may also not completely separated from each other, so as to maintain the state of loosening engagement. In this state, the user may use a greater force to adjust the inclined angle θ of the plate body 1611 of the VESA board 161 with respect to the adapter 163. In addition, overturn can be prevented through calculating the number of rotating teeth of the first gear portion 1621 or the second gear portion 1651 during rotation or through the hand feeling feedback when the teeth are engaged one by one to determine the rotating/turning angle and the disposition of the recess 1622 and the protrusion 1652.

Summarily, in the support arm having the hinge of the disclosure, after the user first greatly adjusts the rotating angle (or position) of the support arm relative to the base and slightly adjust the electronic device to the predetermined angle by using the hinge, and the angle of the electronic device can be fixed by the hinge, so the electronic device is not easily moved by an unexpected external force.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A support device, adapted to support an electronic device on a reference surface, comprising:
    a base, mounted on the reference surface;
    a support arm, having a first end and a second end, wherein the first end is pivotally connected to the base;
    an air spring unit, disposed at the support arm and comprising:
        a switch assembly, having a rotatable cam, the cam having a first lock point and a second lock point;
        an air spring, constantly providing a supporting force to the support arm, and having a tube, a piston rod, and a release pin, the tube being disposed in the support arm, the piston rod being telescopically disposed at a first end of the tube, and the release pin being disposed at a second end of the piston rod far away from the tube; and
    a hinge, connected to the second end of the support arm, for mounting the electronic device;
    wherein, when the release pin abuts against the first lock point of the cam, the piston rod can be moved relative to the tube, and a position of the hinge can be adjusted and then stopped at any position between highest and lowest positions, and when the release pin abuts against the second lock point of the cam, the piston rod cannot be moved relative to the tube, the position of the hinge cannot be adjusted between the highest and lowest positions;
    wherein the switch assembly further has a handle, the handle can drive the cam to rotate between an open position and a closed position, the release pin abuts against the first lock point at the open position, and the release pin abuts against the second lock point at the closed position,
    wherein the switch assembly further has a body, the cam is disposed in the body, the handle penetrates through the body and the cam, and the piston rod of the air spring abuts against the body,
    wherein the body has an accommodating space and a connecting hole, the connecting hole communicates with the accommodating space, the cam is accommodated in the accommodating space, and the release pin of the air spring passes through the connecting hole to abut against the cam.

2. The support device as recited in claim 1, wherein the body further has a main hole communicated with the accommodating space, the handle has a first grip and a shaft, the first grip is exposed from the support arm, and the shaft penetrates through the main hole and the cam.

3. The support device as recited in claim 2, wherein the first lock point is located at a position where the cam has a minimum cam radius, and the second lock point is located at a position where the cam has a maximum cam radius.

4. The support device as recited in claim 3, wherein the support arm comprises an upper connecting rod, a base rod, a lower connecting rod, and an engaging rod pivotally connected to each other, the base rod is disposed on the base, the hinge is disposed on the engaging rod, the upper connecting rod and the base rod are pivotally connected to a first axis, the base rod and the lower connecting rod are pivotally connected to a second axis, the lower connecting rod and the engaging rod are pivotally connected to a third axis, the engaging rod and the upper connecting rod are pivotally connected to a fourth axis, so as to constitute a structure of parallel four-bar linkage.

5. The support device as recited in claim 4, wherein the air spring further has a pivot unit connected to the tube and pivotally connected to the base rod.

6. The support device as recited in claim 5, wherein the pivot unit has a screw head and a pushing rod pivotally connected to each other, the screw head is screwed to the tube on a side far away from the piston rod, the pushing rod is pivotally connected to the base rod at a position between the first axis and the second axis, and the body of the switch assembly is disposed on the fourth axis.

7. The support device as recited in claim 6, wherein the second axis and the fourth axis have a distance therebetween, the air spring has a total length, when the support arm is pivotally rotated relative to the base to the highest position, the distance and the total length are maximum.

8. A support device, adapted to support an electronic device on a reference surface, comprising:
    a base, mounted on the reference surface;
    a support arm, having a first end and a second end, wherein the first end is pivotally connected to the base;

an air spring unit, disposed at the support arm and comprising:
  a switch assembly, having a rotatable cam, the cam having a first lock point and a second lock point;
  an air spring, constantly providing a supporting force to the support arm, and having a tube, a piston rod, and a release pin, the tube being disposed in the support arm, the piston rod being telescopically disposed at a first end of the tube, and the release pin being disposed at a second end of the piston rod far away from the tube; and
a hinge, connected to the second end of the support arm, for mounting the electronic device;
wherein, when the release pin abuts against the first lock point of the cam, the piston rod can be moved relative to the tube, and a position of the hinge can be adjusted and then stopped at any position between the highest and lowest positions, and when the release pin abuts against the second lock point of the cam, the piston rod cannot be moved relative to the tube, the position of the hinge cannot be adjusted between the highest and lowest positions,
wherein the hinge comprises:
a VESA board, having a plate body and a pair of assembly portions, wherein the pair of assembly portions are bent from two opposite sides of the plate body towards the same direction;
a first gear, having a first gear portion and a recess, wherein the first gear portion and the recess are adjacent to each other;
an adapter, pivotally connected to the support arm, having two position limiting walls, a pair of wing plates, and a position limiting groove, wherein the position limiting walls and the wing plates together define the position limiting groove;
a second gear, having a second gear portion and a protrusion, wherein the second gear portion and the protrusion are adjacent to each other, and the second gear portion is adapted to engage with the first gear portion;
an operating rod, having a second grip and a rod body, wherein the rod body is extended in an axial direction, the VESA board and the adapter are pivotally connected to the rod body, and the first gear and the second gear are sleeved on the rod body; and
a spring, disposed between the second gear and the first gear and constantly applying a force to separate the second gear and the first gear from each other;
wherein the operating rod can be rotated to switch between a locked state and an unlocked state, in the locked state, the second gear portion and the first gear portion are engaged and the VESA board is unable to rotate relative to the adapter, and the VESA board can be rotated relative to the adapter in the unlocked state.

9. The support device as recited in claim 8, wherein the rod body has a column part and a threaded part, the column part is located between the threaded part and the second grip.

10. The support device as recited in claim 9, wherein the first gear further comprises a central through-hole, the second gear further comprises a first central hole, the hinge further comprises a stop plate disposed at a side of the second gear far away from the first gear and having a second central hole, the rod body of the operating rod penetrates through the central through-hole, the first central hole, and the second central hole, and the second central hole and the threaded part are screwed with each other.

11. The support device as recited in claim 9, wherein the hinge further comprises a locking member fastened to the threaded part of the rod body of the operating rod, so the rod body of the operating rod rotatably fastens with the wing plates and the assembly portions.

12. The support device as recited in claim 8, wherein the hinge further comprises a plurality of gaskets sleeved on the operating rod, and one of the gaskets is located between the locking member and one of the wing plates or one of the gaskets is located between the second grip and one of the wing plates.

13. The support device as recited in claim 8, wherein the protrusion is correspondingly accommodated in the recess.

14. The support device as recited in claim 13, wherein the protrusion has a first maximum arc length and a first central angle correspondingly in the axial direction, the recess has a second maximum arc length and a second central angle correspondingly in the axial direction, the second central angle is greater than the first central angle, and an angle that the VESA board can rotate relative to the adapter is a difference between the second central angle and the first central angle.

* * * * *